(12) United States Patent
McLane, Jr.

(10) Patent No.: US 6,331,760 B1
(45) Date of Patent: *Dec. 18, 2001

(54) CAPACITIVE INDUCTION MOTOR AND METHOD

(76) Inventor: Oscar B. McLane, Jr., 3732 Nereis Dr., La Mesa, CA (US) 91941

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,391

(22) Filed: Oct. 6, 1998

(51) Int. Cl.[7] ................................................ H02P 1/26
(52) U.S. Cl. .................... 318/767; 318/729; 318/771; 318/794; 318/795; 318/796; 318/814; 310/179; 310/180; 310/184; 310/200
(58) Field of Search ..................................... 318/729, 771, 318/814, 438, 502, 509, 508, 794–796; 310/179–180, 184, 200

(56) References Cited

U.S. PATENT DOCUMENTS

| | | | |
|---|---|---|---|
| 1,741,518 | * 12/1929 | Hough | 318/729 |
| 1,837,563 | * 12/1931 | Mayer | 318/729 |
| 1,854,447 | * 4/1932 | Chromy | 318/729 |
| 2,664,534 | * 12/1953 | Noodlemen et al. | 318/814 |
| 3,526,816 | * 9/1970 | Paice et al. | 318/771 |
| 4,063,135 | 12/1977 | Wanlass . | |
| 4,095,149 | 6/1978 | Wanlass . | |
| 4,132,932 | 1/1979 | Wanlass . | |
| 4,152,630 | * 5/1979 | Wanlass | 318/796 |
| 4,187,457 | 2/1980 | Wanlass . | |
| 4,338,557 | * 7/1982 | Wanlass | 318/729 |
| 4,607,206 | * 8/1986 | Sember et al. | 318/798 |
| 4,761,602 | * 8/1988 | Leibovich | 318/816 |
| 4,801,832 | * 1/1989 | Neumann | 310/216 |
| 4,896,063 | * 1/1990 | Roberts | 310/68 R |
| 4,937,513 | * 6/1990 | Hoemann et al. | 318/772 |
| 5,065,305 | * 11/1991 | Rich | 363/150 |
| 5,134,332 | * 7/1992 | Nakamura et al. | 310/208 |
| 5,327,069 | * 7/1994 | Radun et al. | 322/10 |
| 5,598,079 | * 1/1997 | Robert | 318/780 |

* cited by examiner

*Primary Examiner*—Robert E. Nappi
*Assistant Examiner*—Tyrone Smith
(74) *Attorney, Agent, or Firm*—Knobbe, Martens, Olson & Bear, LLP

(57) ABSTRACT

An improved induction motor having at least one capacitive element electrically connected in parallel with and tapped to each phase of a delta- or wye-wound stator winding such that the capacitive elements are alternately charged or discharged during operation, thereby storing energy from and releasing energy to the windings. This alternate energy storage and release assists in controlling the level of magnetic core saturation and increasing motor efficiency under all operating conditions due to reduced hysteresis and eddy current losses. Motor starting or inrush current is also substantially reduced using this arrangement. In one embodiment, variable capacitors and switch elements are used to provide the ability to dynamically "tune" the motor winding for optimal efficiency.

31 Claims, 8 Drawing Sheets

CAPACITIVE INDUCTION MOTOR AND METHOD

BACKGROUND OF THE INVENTION

1. Field of the Invention

This invention relates to the field of electrical motors, and more specifically to high efficiency polyphase induction motors.

2. Description of Related Technology

Induction motors are well known in the electrical arts. The typical induction motor is comprised of 1) a series of electrically interconnected windings (one for each phase in a polyphase system), 2) a stator containing these windings and having a magnetically permeable core, and 3) a rotor having an electrically conductive structure ("cage"). The polyphase windings are most often arranged in the well known "delta" or "wye" configurations, as show,n in FIGS. 1a and 1b, respectively. While single phase induction motors can be made, such motors develop no starting torque, and therefore require a separate motive force to initiate rotor movement. For these and other reasons, the great majority of all induction motors in use are polyphase (typically three-phase).

As its name implies, the induction motor works on the principle of inductive (versus electrical) power transfer from the stator to the rotor. In simple terms, power is transferred to the rotor by virtue of the electromotive force (emf) induced in the rotor conductors due to the relative motion of those conductors through a magnetic field. Since no torque on the rotor is generated when no relative motion exists, the rotor must necessarily turn slower or "slip" in relation to the stator field. This slip is typically on the order of 2–5%. Generally speaking, greater slip corresponds to greater rotor torque and greater current draw. Note also that a secondary magnetic field is generated by the rotor due to the current low within the rotor conductors. The electromotive force (emf) induced within the rotor "leads" the induced rotor magnetic field, since the rotor conductors have a non-zero reactance.

The polyphase induction motor provides several advantages over other types of motors, including most notably a comparatively simple construction which obviates the need for any brushes or slip rings, good efficiency, high starting torque, and good reliability.

Despite the aforementioned advantages of the induction motor, several limitations also exist. For example, while producing a high torque, the motor draws a very high current when starting, typically requiring, some sort of current limiting device to prevent excessive current from damaging the windings. This high inrush current can also place operational limitations on the motor (for example, by requiring the operator to start multiple motors in staggered fashion rather than simultaneously), and further adversely impact the motor current source by tripping distribution feeder protection (breakers) or even the source output breaker in the case of large motors if the operator is not cautious.

Additionally, when heavily loaded or overloaded, the typical induction motor draws a high current as the rotor is slowed by the counter torque of the increased load, thereby necessitating the use of a separate protective device or circuit. Accordingly, to compensate for these large currents and limit the possibility of winding damage during such hitch load conditions, the stator magnetic flux density must be maintained by design at comparatively low levels during normal operations. Hence, a larger motor than would otherwise be required to produce the same power output is needed, since some of the capacity of the motor is effectively unused.

In addition to the limitations described above induction motors experience inefficiencies or losses relating to their construction and the use of alternating current as the motive energy source. Alternating, current losses are generally related to 1) the AC resistance of the winding conductor(s); and 2) the properties of the magnetic stator core ("core losses"). Core losses are attributable to a variety of effects including most notably magnetic hysteresis and eddy (circulating) currents.

Magnetic hysteresis is the property by which the application of an external magnetic field (H) to a material results in the temporary alteration of the magnetic domains (dipoles) within the material such that a residual magnetic flux (B) is created. After initial magnetization, when the external field is applied, the domains realign in accordance with the field and produce an internal magnetic flux. At some point, however, increasing the applied external field will produce no further increase of the internal field; this condition is referred to as saturation. As the external magnetic field is reduced in intensity and reversed, the now-aligned dipoles within the material maintain the internal field density at a comparatively high level until coerced by the reversed external field to realign in an alternate orientation. This process is represented by the hysteresis curve of FIG. 2. So-called "hard" materials (such as those typically used in permanent mag,nets) have a comparatively high coercivity, such that a significant external field is required to realign their dipoles. "Soft" magnetic materials (such as those in motor stator cores) are more easily aligned with little external field, although some minimum field strength is required. The area within the hysteresis curve of FIG. 2 is related to the coercivity of the material; a hard material has a greater bounded area than a soft material under the same conditions, and therefore greater hysteresis losses for the same ac frequency.

It can be seen that energy must be utilized to realign the magnetic domains within a permeable material, thereby creating losses. This is further evidenced by the fact that alternating current systems using magnetic cores generate heat within the stator due strictly to hysteresis effects. At alternating frequencies on the order of 50–60 Hz, these losses can be quite significant.

Eddy currents are essentially localized circulating currents within a conductor or magnetic core. Eddy currents arise due a variety of factors including spatially and/or temporally non-uniform magnetic fields, and conductor material imperfections or inclusions. Eddy currents result in lower device efficiency and power loss since energy is ultimately dissipated from the device in the form of heat and secondary electric/magnetic fields generated by the circulating currents. Heat generation by a motor is a critical factor, since it can affect the overall power rating of the motor (for a given input voltage frequency, and physical configuration), and also may reduce the longevity of the motor.

The effects of eddy currents may be mitigated through the use of smaller diameter, layered, or segmented conductors or core elements thereby reducing the magnitude of the circulating current. Another method of reducing eddy current losses is to control the magnetic flux density (and uniformity thereof) in the region of the conductors and core.

Prior art designs have attempted to control stator core flux density and mitigate the effects of hysteresis and eddy current losses. Of particular relevance are U.S. Pat. Nos. 4,063,135, 4,132,932. 4,152,630, and 4,187,457 assigned to Wanlass, which generally disclose, inter alia, an alternative induction motor winding arrangement using one or more capacitors in series with the phase (stator) windings of the motor; see FIG. 3a and 3b, which illustrate two exemplary prior art winding configurations. This series arrangement in theory is meant to maintain the stator flux density at a comparatively high level during normal operation through the storage of energy in the series capacitors, without high input voltages resulting in high input currents. Additionally, in theory, the series capacitor limits the energy transfer to the rotor, thereby maximizing rotor current for the given voltage and frequency input. U.S. Pat. No. 4,095,149 also assigned to Wanlass discloses a system by which the stator core is maintained in partial saturation as a function of motor load, thereby in theory reducing the energy storage capacity of the stator core and hence the losses associated therewith, especially at low load levels.

However, in practice, the aforementioned series capacitance and core saturation arrangement provides little in the way of measurable benefit in terms of increased efficiency, reduced no-load draw, and reduced starting current. Specifically, the Wanlass design uses two separate windings having an equal number of turns; in practice, each winding tends to cancel out the benefits in terms of core saturation control provided by the other winding. See FIGS. 3a and 3b. Additionally, the use of two separate windings further complicating the motor and increasing its weight, manufacturing cost, and the possibility of component failure.

Based on the foregoing, an improved controlled flux density induction motor winding arrangement is needed which is comparable in size and weight to prior art induction motors, yet has reduced AC core losses, is more efficient, and operates at reduced current under all conditions of loading. Furthermore, a motor incorporating such an improved winding would have a reduced inrush starting current, and operate at reduced temperature, thereby increasing component lifetime.

SUMMARY OF THE INVENTION

The present invention satisfies the aforementioned needs by providing an improved polyphase induction motor and winding which is significantly more efficient than prior art induction motors, including the series capacitance motors described above.

In a first aspect of the invention, an improved induction motor winding is provided. In a first embodiment, a single three phase ac winding connected in a delta configuration is disclosed. The windings are configured such that each phase employs a tapped winding wired electrically in parallel with the primary phase winding. The taps winding are electrically connected through capacitors to adjacent common connection points (nodes) of the delta. Using this configuration, the transient energy associated with the ac waveform applied to each phase alternatively charges and discharges the capacitor(s). At low loads, the saturation of the magnetically permeable material in the stator core (and the effective flux density in the region of the core) is controlled. At higher loads, greater saturation of the core is accommodated, thereby increasing the core flux density and effective horsepower of the motor. However, even at full load, the peak saturation of the core is below that of a conventional induction motor of similar rating. The effective result of this arrangement is 1) reduction of ac losses and increased motor efficiency at all operating loads; 2) reduced starting (inrush) current, and 3) reduced current draw at both no load and full load conditions.

A second embodiment of the induction motor winding of the present invention employs a wye type configuration having similar windings with capacitive couplings to the central winding node(s).

In a third embodiment, the capacitive couplings between the phases of the delta or wye windings of the first and second embodiments described above are selectively tunable and switchable such that a motor utilizing either of these windings may be operated with varying amounts of capacitive coupling between the individual winding phases. Additionally the winding tap points are variable so as to permit optimization of the operation (and efficiency) of the motor under varying operational conditions.

In a second aspect of the invention, an improved induction motor is disclosed. The motor uses the previously described embodiments of the delta- or wye-wound stator winding with windings and capacitive couplings. The reduced ac losses of the stator and controlled stator magnetic flux density produce less heating, and increase the efficiency of the motor such that the required current necessary to operate the motor at a given load is substantially reduced over prior art induction motors. In a first embodiment, a three-phase squirrel cage induction motor is disclosed having magnetically permeable material in both the stator and rotor.

In a third aspect of the invention, an improved method of operating the aforementioned induction motor is disclosed. The capacitance is selectively applied to the windings (using the aforementioned tuning and/or switching arrangement) and the tap points are adjusted so as to optimize the operation of the motor under varying operational conditions.

DETAILED DESCRIPTION OF THE INVENTION

Reference is now made to the drawings wherein like numerals refer to like parts throughout.

Figure 1B:
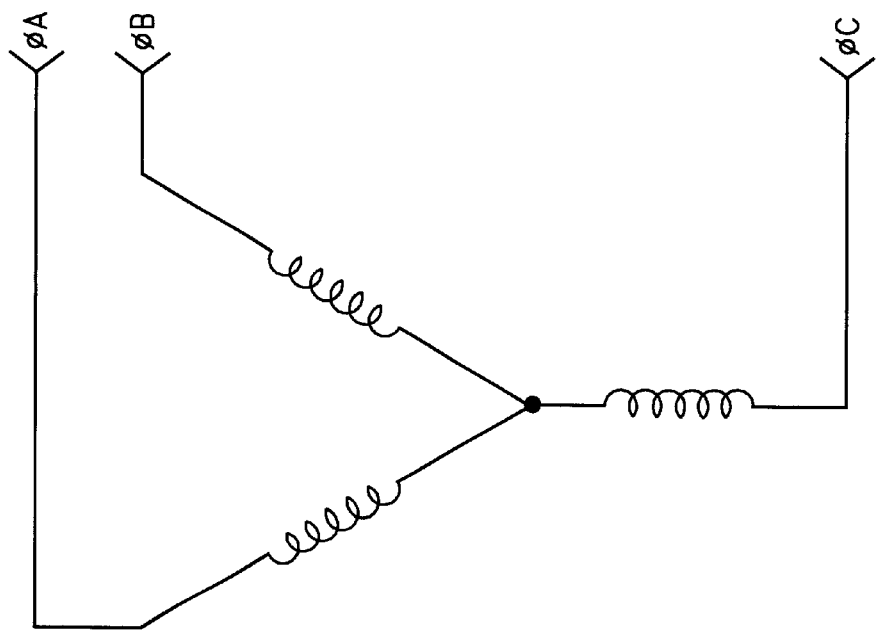
FIG. 1b is a schematic diagram of a prior art induction motor stator winding constructed in a "wye" configuration.
Figure 1A:
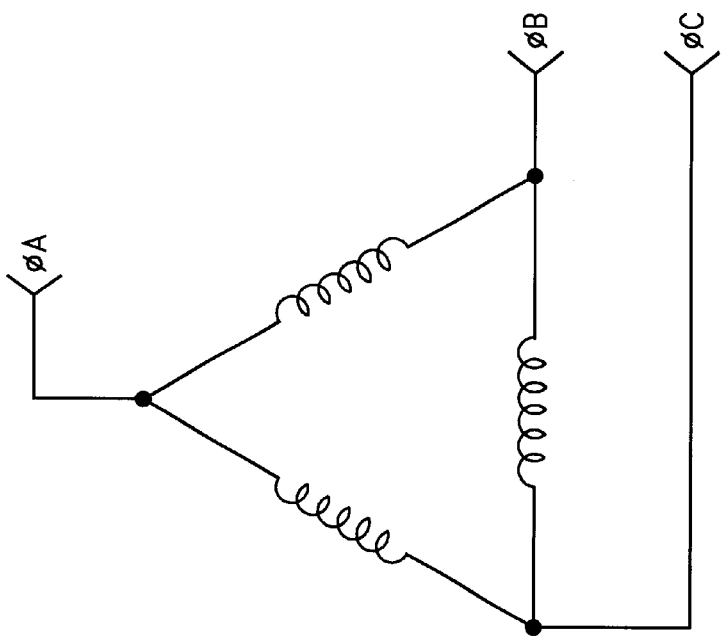
FIG. 1a is a schematic diagram of a prior art induction motor stator winding constructed in a "delta" configuration.
Figure 2:
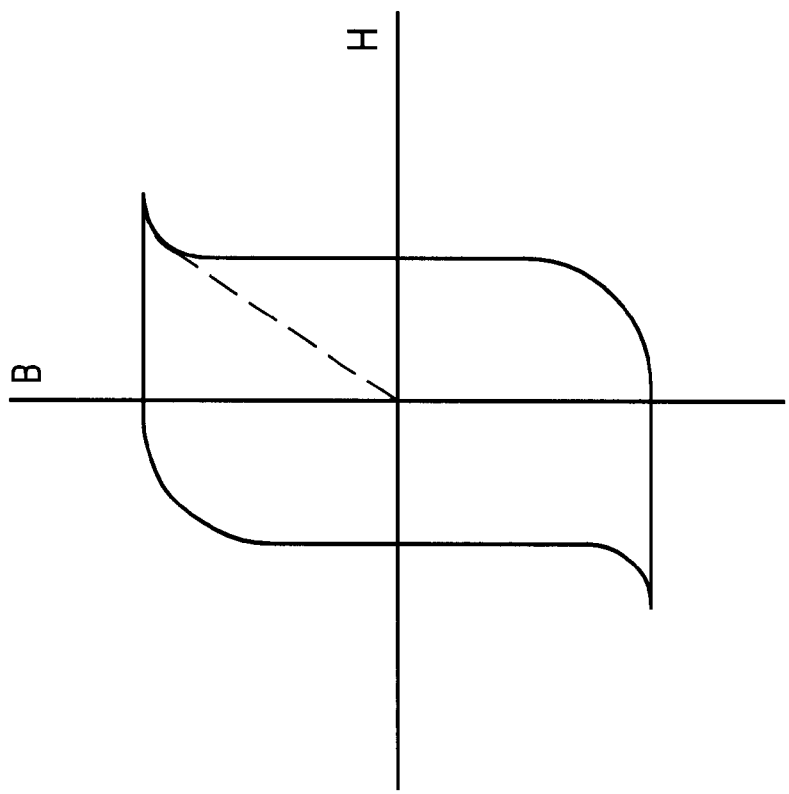
FIG. 2 is an illustration of a typical hysteresis loop for a magnetically permeable material.
Figure 3B:
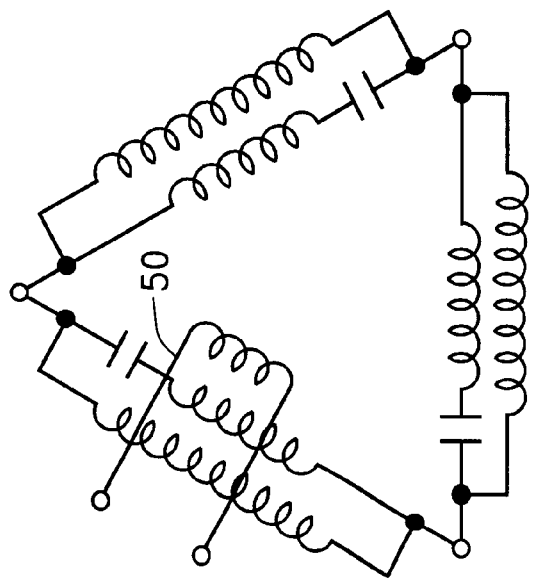
FIG. 3b is a schematic diagram of an exemplary prior art controlled flux density induction motor stator winding constructed in a "delta" configuration.
Figure 3A:
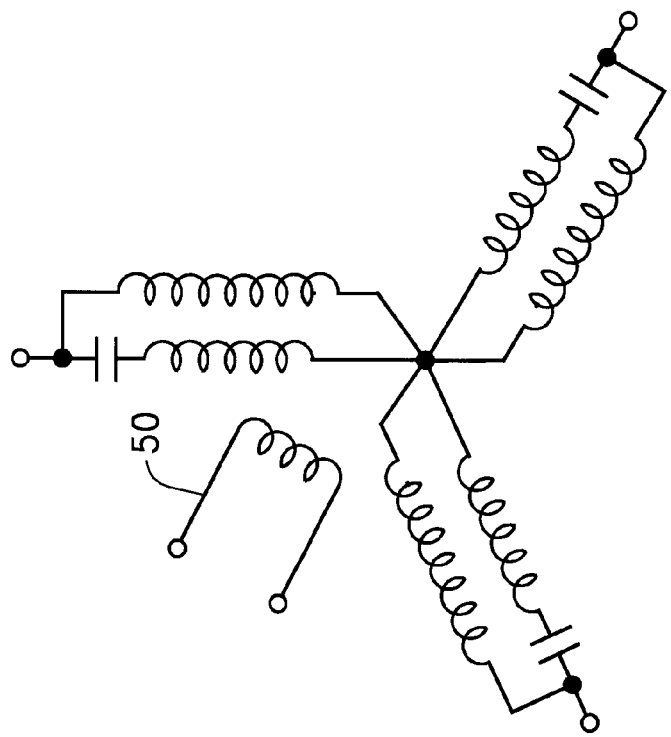
FIG. 3a is a schematic diagram of an exemplary prior art controlled flux density induction motor stator winding constructed in a "wye" configuration.
Figure 4:
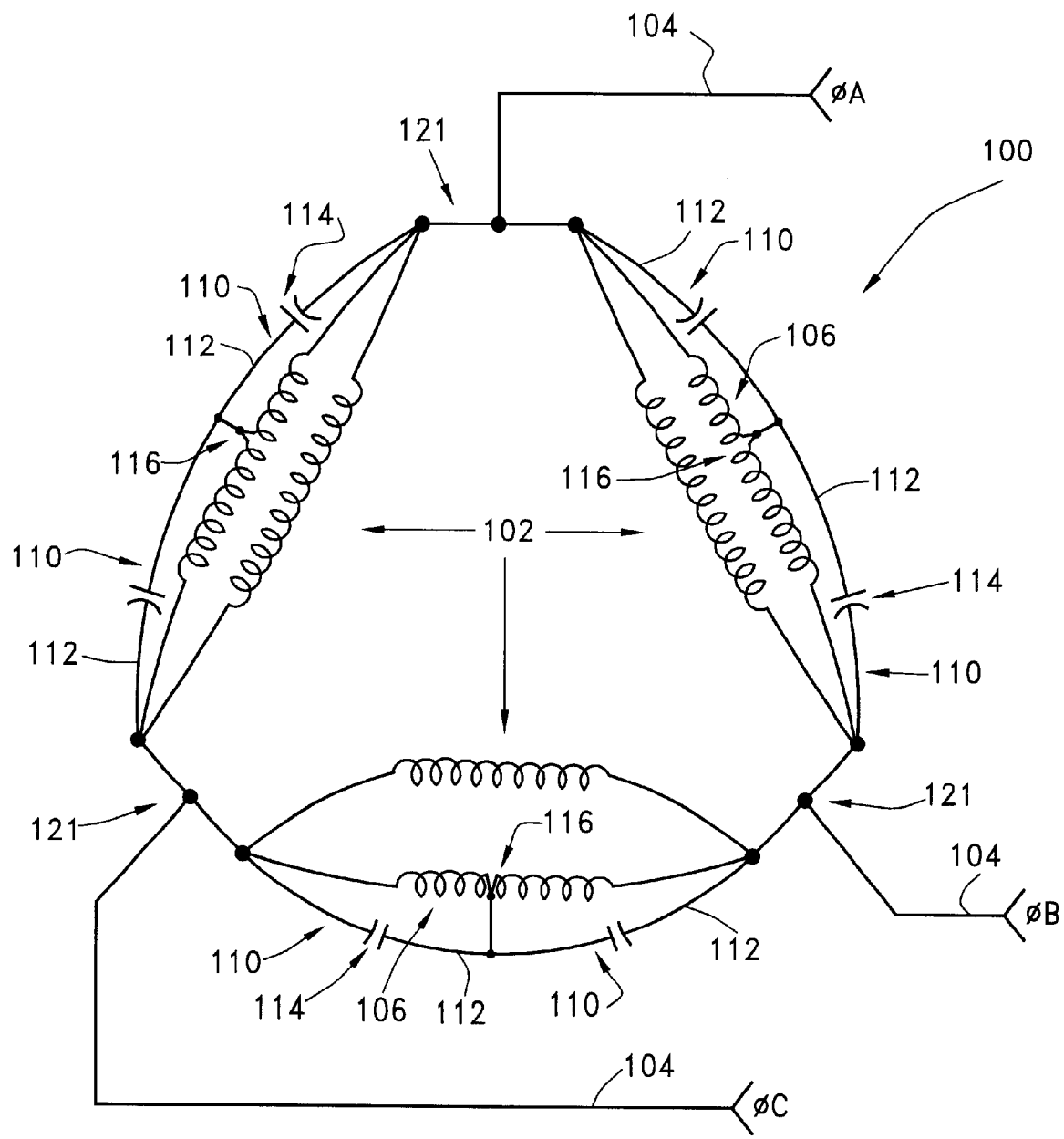
FIG. 4 is schematic diagram of a first embodiment of an induction motor winding according to the present invention, utilizing a "delta" winding configuration.

Referring now to FIG. 4, a first embodiment of the induction motor winding according to the present invention is described. The polyphase winding 100 is comprised of a plurality of primary phase windings 102 arranged in a delta configuration and connected to a source via a plurality of line terminals 104 as is well know in the electrical arts, In the embodiment of FIG. 4, three primary windings 102 or "phases" are selected due to the widespread use of three-phase ac power (especially in larger industrial applications) and its inherent benefits, although it can be appreciated that other numbers of primary phase windings may be used. The phase windings 102 are comprised of metallic conductors (ideally copper, although other conductive materials may be substituted) which are ultimately wound around or within a magnetically permeable stator core using any one of a number of well known winding techniques as described below in reference to FIG. 8. The winding 100 is wound so as to generate a rotating magnetic field within the stator which acts upon the rotor conductors (not shown).

In addition to the primary phase windings 102, the embodiment of FIG. 4 employs a set of tapped windings 106 and capacitive couplings 110. The windings are connected electrically in parallel with the primary phase windings as shown in FIG. 4. The capacitive couplings 110 consist of a pair of electrical conductors 112 having one or more capacitive elements 114 connected thereto. The capacitive couplings 110 are in the present embodiment each connected on one end (e.g., "tapped to") to electrical taps 116 located on each of the respective windings 106 (as well as the other coupling for that phase), and on the other end to the nearest corresponding winding node 121. The taps 116 are physically constructed by looping the conductor(s) of the capacitive couplings 110 onto the windings 106 at the prescribed location (e.g., number of turns). As is well known in the electrical arts, the relative location of the taps 116 is related to the effective inductance, impedance, and reactance of the winding, and is therefore selected to provide the desired electrical properties for a given application. In the present invention, the tap locations 116 are selected based primarily on the calculated density of ferrous material in the stator core, which varies for each individual core. Core density may be calculated using relationships well know in the art, such as:

$$T_2 = T_1 \times \frac{E_2}{E_1} \times \sqrt{\frac{HP_1}{HP_2}} \times \sqrt{\frac{F_1}{F_2}} \times$$

$$\frac{CF_1}{CF_2} \times \frac{N_2}{N_1} \times \left( \sqrt{3} \ (wye) \text{ or } \sqrt{\frac{1}{3}} \ (delta) \right) \times \sqrt{\frac{P_2}{P_1}}$$

$$\text{Core Density} = \frac{\text{Flux per pole}}{2 \times \text{effective core area}}$$

where:

$T_n$=Number of turns on a given winding (tap point)
$E_n$=Voltage
$HP_n$=Horsepower
$F_n$=Electrical frequency
$CF_n$=Chord factor
$N_n$=Circuits
$P_n$=Number of poles A typical location for the tap points is 64% of the total number of turns of the given phase winding, although it will be recognized that other locations may be used. Also, while fixed in the present embodiment, the taps 116 may be variable or adjustable if desired, as described further below.

In the embodiment of FIG. 4, the capacitive couplings are each comprised of a single capacitive element (capacitor) 114 in series with their respective conductor 112. It can be appreciated, however, that a number of alternate arrangements may be used to provide the desired electrical properties depending on the application, such as multiple capacitors in series or parallel, or one or more capacitors in conjunction with another electrical element (such as a resistor or inductor). Furthermore, while a discrete capacitor is used as the capacitive element 114 in this embodiment, other devices having capacitive properties may be substituted.

The energy stored by the capacitors 114 is described generally by the relationship:

$$E = \tfrac{1}{2} CV^2 \qquad \text{Eqn. (1)}$$

Where:

E=Energy (in Joules)
C=Capacitance (in farad)
V=Voltage across capacitor (volts)

This quantity represents both the energy stored (per capacitor) during charging and the energy released during discharging. It can be seen that the voltage applied across the capacitor (e.g., across the taps connected to the individual phase windings to which the capacitor is connected and the respective winding phase node) significantly affects its energy storage.

The capacitance values of the capacitive elements 114 of FIG. 4 are ideally chosen according to the following guidelines:

$$\text{Capacitance (KVAR, per phase)} = 0.12 \times HP \text{ (per phase)} \qquad \text{Eqn. (2)}$$

and $$\text{Capacitance (microfarad, per phase)} = HP \times \left(\frac{V_R}{V_L}\right)^2 \times 1.5 \qquad \text{Eqn. (3)}$$

where:

HP=Horsepower (1 HP approx. equals 746 Watts)
KVAR=Kilo-volt-amps (reactive)
$V_R$=Rated Voltage
$V_L$=Line voltage For example, capacitance values of 8.85 microfarad would be used in a three-phase, 480 V motor rated at 3.73 KW (5 HP). Note that if 8.85 microfarad capacitors are not available, the next nearest standardized increment (such as 10 microfarad) may be used with little impact on motor performance.

In the present embodiment, the capacitances per phase are chosen to be equal, thereby providing balance between the three phases, and also such that the performance of the motor is optimized for the given line voltage and power rating. However, it will be recognized that the system may be operated (at reduced efficiency) in an unbalanced configuration if desired.

The winding 100 of FIG. 4 operates in the following manner. When a polyphase alternating current is applied to the winding via the terminals 104, voltages are successively induced in each of the individual phase windings 102. The relative magnitude and phase relationships of these voltages are well known in the electrical art. For example, it is well known that 1) the line current $I_L$ for a delta connected system is $\sqrt{3}$ times the phase current, and lags the phase current $I_{jk}$ by 30) degrees: and 2) the induced phase voltage $V_{jk}$ is equal to the line voltage $V_L$ (note that the subscripts "j" and "k" refer to various combinations of individual phases within the winding). Current flow in the windings results from the induced voltages; however, due to the inductive properties of the phase windings 102, the current is in a phase relationship with the voltage. As the current in a given phase winding 102, 106 increases, the resulting magnetic field (H) generated by the phase winding also increases. This magnetic field acts to align the magnetic domains within the local region of the stator core, and increase the internal magnetic flux density (B) of the core material. In tandem, the capacitive elements 114 associated with that phase are charged, thereby storing energy. Unlike prior art motors in which complete or near-complete saturation of the magnetic core is rapidly reached when the inductive energy storage capacity of the winding is exceeded, the present invention utilizes the capacitive elements 114 to limit the energy storage (and therefore saturation) within the stator core, thereby controlling the flux density within the core. As the voltage for a given phase winding decreases, the capacitor(s) act as an energy source and begin to discharge, thereby maintaining current flow through the phase windings 102, 106. In this fashion, the capacitive elements 114 "buck" the field generated by the phase winding by alternatively storing energy during periods of energy storage within the core and inductance of the winding, and discharging (acting as a current source) during periods when the phase voltage is reversing. This has the net effect of limiting the effective flux density and saturation of the core, and therefore ac losses associated therewith.

Figure 5:
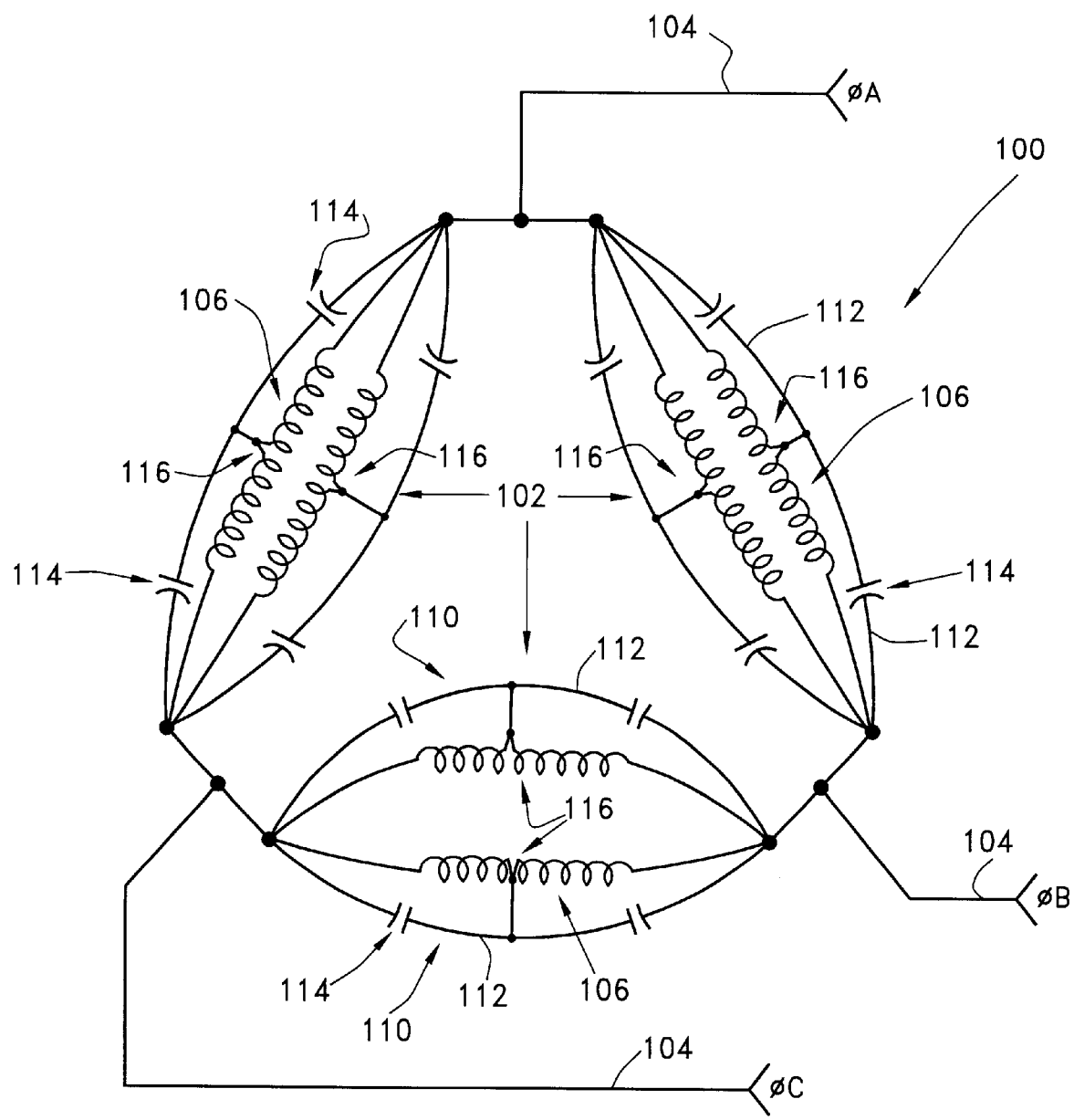
FIG. 5 is schematic diagram of a second embodiment of an induction motor winding according to the present invention, utilizing a "delta" winding configuration and having both primary and secondary phase windings capacitive coupled.

FIG. 5 illustrates a second embodiment of the improved winding of the present invention. This second embodiment is also a delta configuration, yet has two sets of capacitive couplings 110, one set attached to each of the primary and tapped windings 102, 106 for each phase. Note that the previously described embodiment of FIG. 4 has the benefit of greater simplicity in that a second set of capacitive couplings 110 are not required for each primary phase winding as it is for the embodiment of FIG. 5. Accordingly, however, larger capacitors 114 are require to maintain the same energy storage per phase, and the physical layout of the windings must be more carefully considered to maintain adequate uniformity of saturation within the stator magnetic core.

Figure 6:
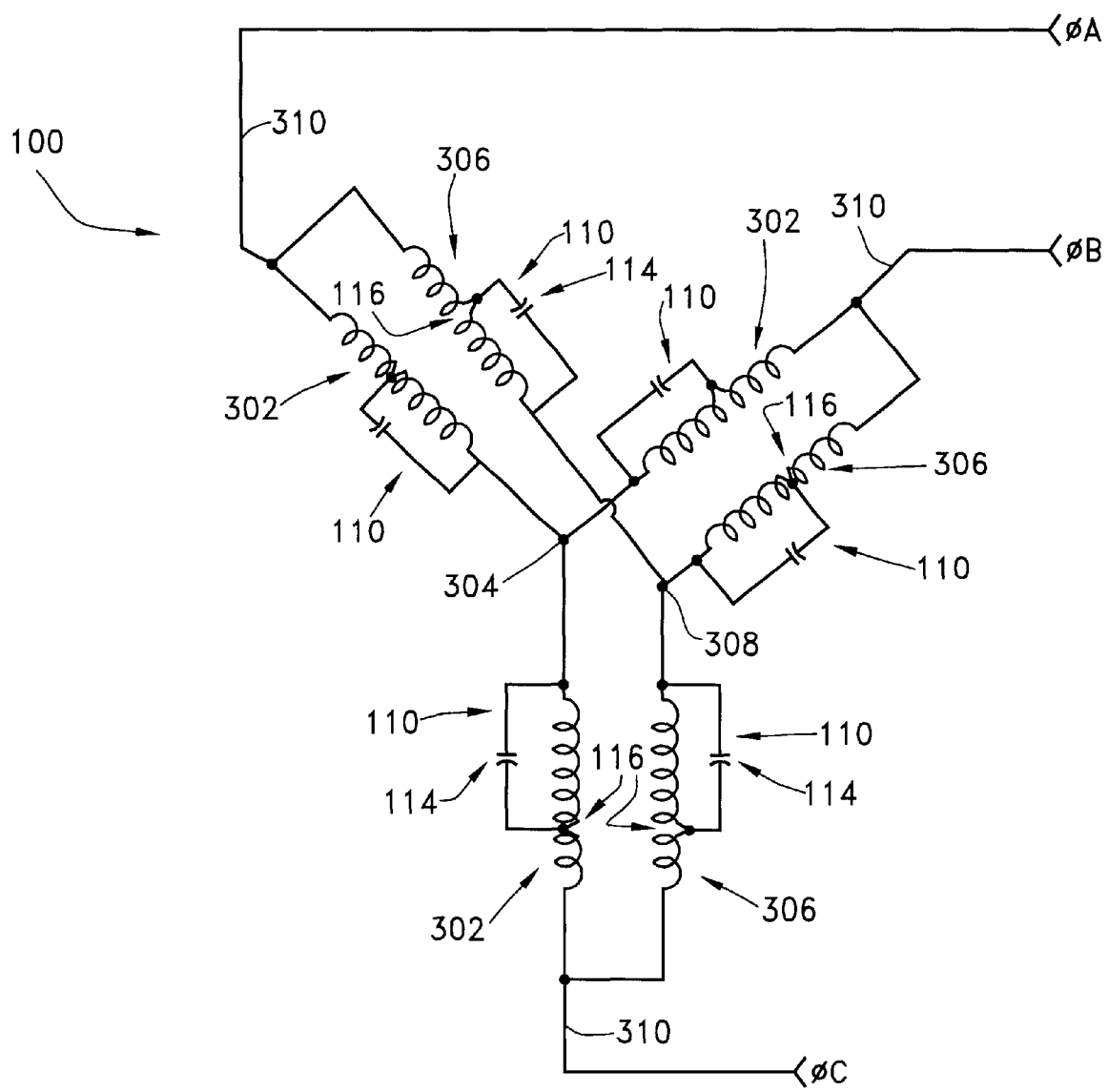
FIG. 6 is schematic diagram of a third embodiment of an induction motor winding according to the present invention, utilizing a "wye" winding configuration.

FIG. 6 illustrates a third embodiment of the induction motor winding of the present invention, utilizing as its basis a wye configuration of the type well known in the electrical arts. Unlike the delta configuration, the line and phase currents in a balanced wye winding are equivalent, while the line voltage is $\sqrt{3}$ times the phase voltage. However, similar to the delta embodiments of FIGS. 4 and 5 previously described, the wye winding of FIG. 6 utilizes a number of capacitive couplings 110 between taps located on the individual phase windings to effect energy storage and transfer within the windings and magnetic core. Specifically, the embodiment of FIG. 6 employs a set of primary phase windings 302 electrically connected at a primary node 304, and set of tapped windings 306 which are electrically connected at a tapped node 308. The primary and tapped windings 302, 306 for each phase are also electrically connected to each other at the incoming conductor 310 for each phase.

Separate capacitive couplings 110 with capacitors 114 are provided for each phase winding (both primary and tapped) which are on one end electrically connected to their respective winding via taps 116. The other end of each capacitive coupling 110 is connected to the winding conductor for that phase adjacent to the primary (or secondary) node 304, 308, as shown in FIG. 6. Note also that neutral or ground wires connected to the primary and secondary winding node(s) 304, 308 may be employed if the system is unbalanced.

Figure 7:
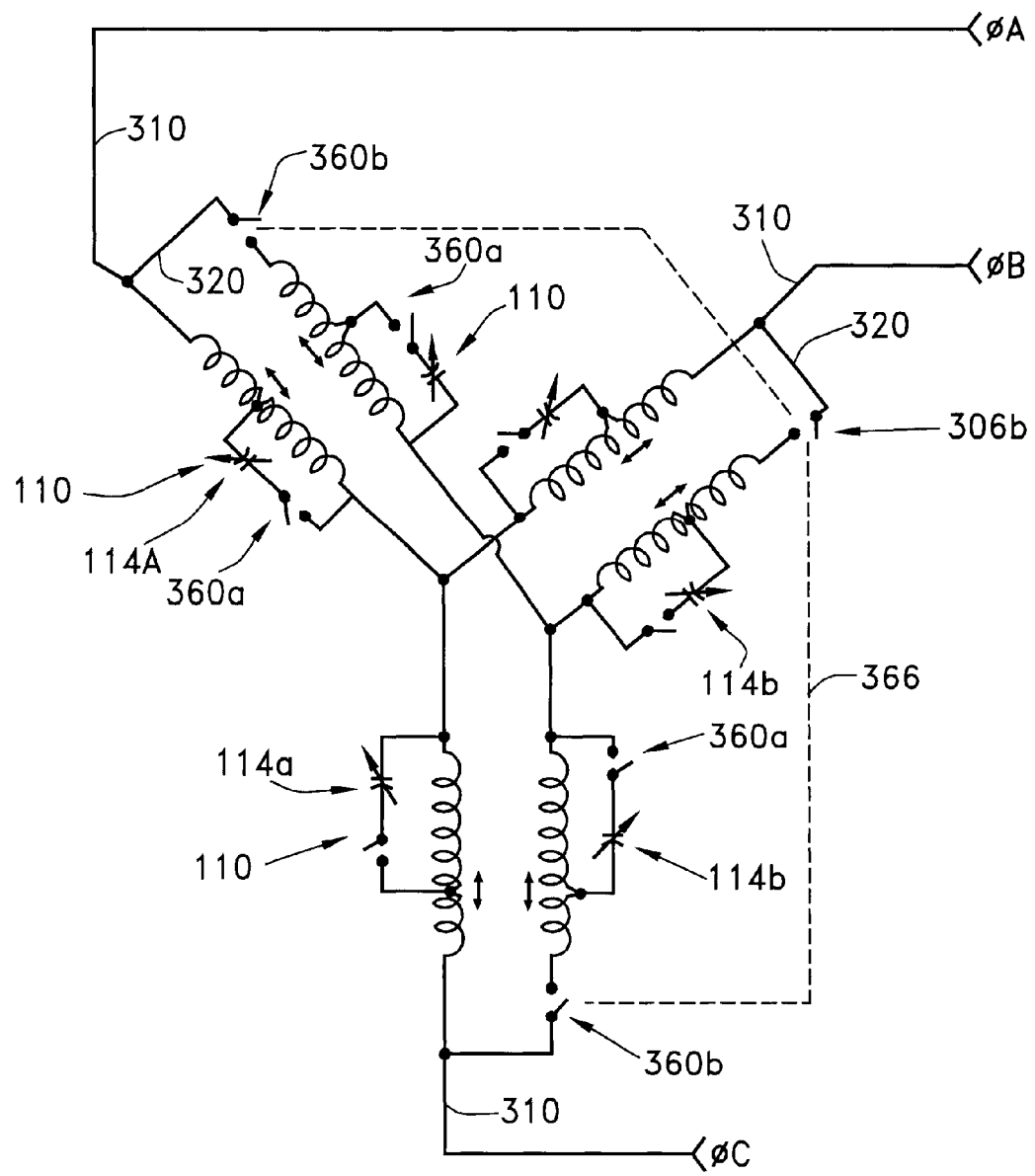
FIG. 7 is a schematic diagram of a fourth embodiment of an induction motor winding according to the present invention, having, a "wye" winding with selectively tunable and switchable capacitive elements and variable winding taps.

Referring now to FIG. 7, a fourth embodiment of the induction motor winding of the present invention is disclosed. As shown in FIG. 7, this embodiment incorporates a wye winding configuration, although it will be recognized that a delta configuration may also be used, depending on the desired properties of the motor in which the winding is installed. The primary distinguishing features of the winding of FIG. 7 over the windings of FIG. 4 through 6 include 1) the use of switch elements 360a, 360b in both the capacitive couplings 110 and the tapped winding conductors 320, respectively, 2) the use of variable capacitors 362 in the capacitive couplings 110 associated with both the primary and tapped phase winding, and 3) the use of variable winding taps.

The switch elements 360a, 360b may be of any type having a current and voltage rating sufficient for the intended application. The use of the switch elements 360a in the primary and secondary winding capacitive couplings 110 permits the operator to selectively insert or remove capacitances 114a, 114b in order to obtain the desired level of performance for a specific operating condition. For example, it may be found that a particular motor incorporating the winding of FIG. 7 operates most efficiently at low load with only the primary phase winding capacitive elements 114a in the circuit. If the motor is operated exclusively at low load, the tapped winding capacitors 114b may, be switched out of the circuit to increase overall motor efficiency.

Similarly, it may be desirable under certain circumstances to operate the motor without the secondary phase windings; in this case, the operator may simply open the switch elements 360b associated with the secondary windings. As shown in FIG. 7, these switch elements 360b are ideally "ganged" (dotted line 366) such that the switches operate in tandem, thereby simultaneously inserting into or removing from the winding circuit all of the phases.

In the event that the operator desires to operate the motor as a standard (e.g. non capacitively coupled) induction motor, both the switch elements 360a for the primary winding couplings 110 and the switch elements 360b for the secondary windings may be opened, thereby electrically isolating the tapped windings for each phase and the capacitive couplings 110.

Referring again to FIG. 7, it will be noted that the present embodiment also uses a series of variable capacitors 114a, 114b of the type well know in the electrical arts as the primary and secondary capacitive elements 114a, 114b, respectively. This arrangement permits variation or tuning of the capacitances both 1) between phases; and 2) between primary and tapped phase windings. This allows for optimization of motor efficiency due to factors including (I) variations in the impedance or other electrical properties of each of the individual phase windings (ii) spatial variations in the stator core iron density. Additionally, the present invention contemplates dynamic tuning of the variable capacitors 114a, 114b in response to parameters (such as phase or line current) sensed or measured from the motor during operation. Such dynamic tuning can easily be accomplished using any number of control arrangements well understood in the electrical arts. As one example, the sensed line current for a motor operating at a constant may be input to a processor and control circuit which varies the capacitance value of one or more of the variable capacitors 114a, 114b through a program band. The control circuit would then maintain the variable capacitance at a value that minimizes line current (assuming constant load) until the load is again varied.

As further illustrated in FIG. 7, variable winding taps 116 may be employed to allow adjustment of the tapping location (and resultant variation of the electrical performance of the winding 100) as desired. Such variable taps may be constructed using any number of well understood techniques, including manually relocatable taps, or motor driven load/no-load tap changers such as those used on large power and distribution transformers.

Figure 8:
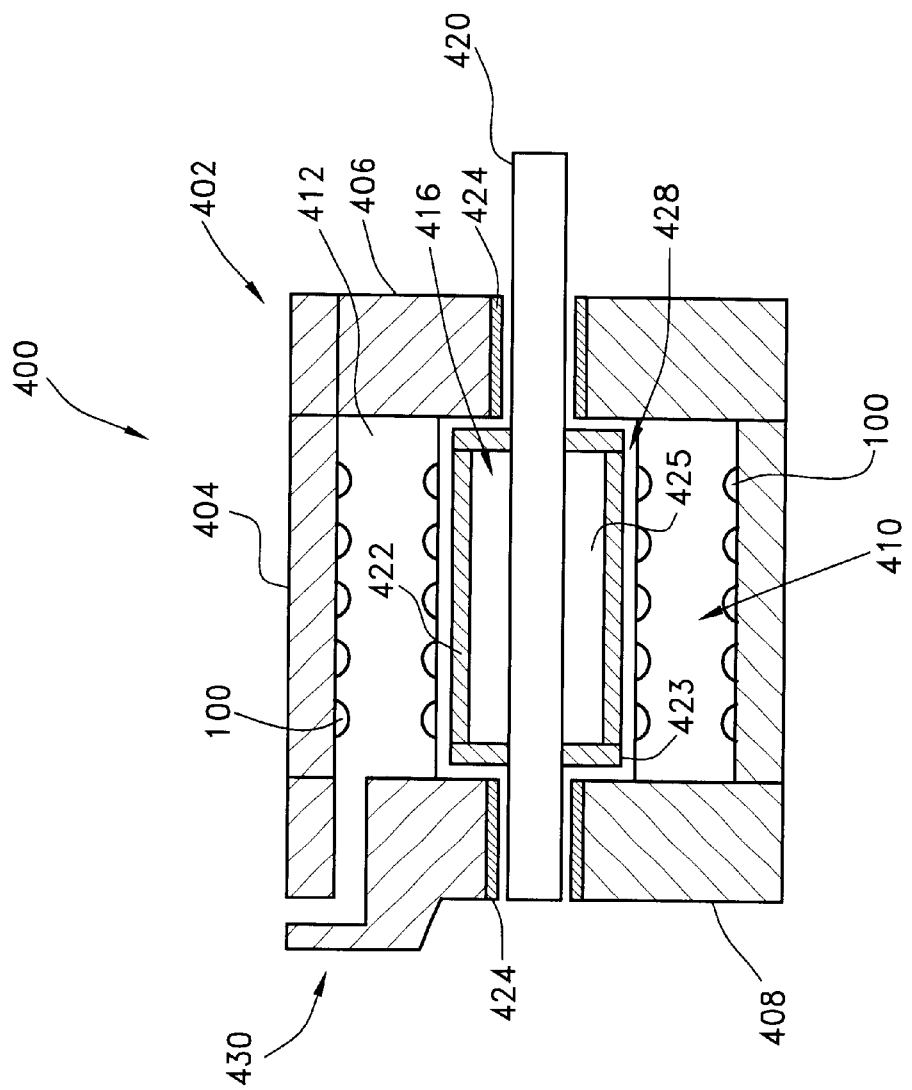
FIG. 8 is a side cross-sectional view of an exemplary induction motor according to the present invention.

An induction motor incorporating the improved windings of the present invention is now described. FIG. 8 is a side cross-sectional view of an exemplary induction motor configuration. As shown in FIG. 8, the motor 400 comprises 1) a housing 402 including a center portion 404 and endbells 406, 408, 2) a stator 410 with magnetically permeable core 412 and windings 100, and 3) a rotor assembly 416 having a main shaft 420, a series of longitudinal conductors 422 and end plates 423 in the familiar "squirrel cage" arrangement, and a magnetically permeable rotor core 425. It will be understood, however, that a wound rotor may also be used in the motor of the present invention. Journal and thrust bearings 424 of the type well know in the mechanical arts are further included within each of the endbells 406, 408 to provide longitudinal and transverse support for the rotor assembly 416. It is noted that any of the aforementioned embodiments of windings 100 (e.g., as depicted in FIGS. 4 through 7 herein) may be used within the motor 400 of FIG. 8, depending on the desired properties of the motor.

Referring again to FIG. 8, the motor 400 is described in further detail. Both the housing center portion 404 and endbells 406, 408 are constructed of a metal (such as steel) to provide sufficient rigidity for the rotor and stator assemblies, although other materials may be used. The magnetically permeable stator core 412 and rotor core 425 may be laminated to reduce eddy current loss, and are generally comprised of iron and a high grade silicon steel, in varying proportions. The stator core 412 is further constructed and sized so as to fit within the housing 402 and maintain a close tolerance (when wound) with the rotor assembly 416. The stator and rotor core material is chosen to be magnetically "soft", e.g., comparatively low coercivity so as to further mitigate ac core losses. The windings 100 are wound into "notches" or grooves within the stator core 412 using any number of well understood techniques such as random or "mush" winding, although it will be appreciated that other types of winding methods and physical configurations may be employed within the present invention. Ideally, the gap 428 between the rotor assembly 416 and the stator 410 is minimized, thereby maintaining the maximum possible degree of flux coupling between the rotor and stator while still allowing for eccentricities and/or thermal expansion and contraction of rotor and stator components during operation. The motor 400 is also provided with an electrical junction box 430 to permit termination of the individual phase leads (and ground lead, if required), commonly referred to as "pigtails".

While the embodiment of FIG. 8 illustrates an induction motor having magnetically permeable core material located within both the stator and rotor, it will be recognized by one of ordinary skill in the electrical arts that the motor 400 may alternatively be constructed with the magnetic core may located in the stator only. Such a design, however, may be less efficient than the embodiment previously described due to reduced magnetic flux density in the region of the rotor.

Empirical performance data obtained 1from working prototypes of the improved induction motor disclosed herein indicates that in fact, motor efficiency is increased over prior art induction motor designs throughout the operating load range. F or example, no load steady state operating current for the present motor design (either delta or wye wound) is reduced by roughly 30% as compared to a conventional 480 V, three-phase induction motor having, no capacitive winding couplings. Full load current is similarly reduced (by roughly 30% for the same motor). Furthermore, peak starting (inrush) current is also substantially reduced (by roughly 20% for the same motor). The measured operating temperature for the motor also reflects measurable improvements.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of connecting polyphase power to a polyphase induction motor winding comprising a primary winding having a plurality of first phase windings, each of said first phase windings being electrically connected to at least one other of said first phase windings, the method comprising:

disposing a tap between a center and a first end of each of said first phase windings;

connecting at least one capacitive element in parallel to a portion of each phase winding between the tap and a second end of the phase winding opposite the first end of the phase winding; and connecting one phase of a polyphase alternating current (ac) power source to an end of each phase winding;

wherein said capacitive elements alternately charge and discharge during the application of a polyphase alternating current to said induction motor winding.

2. The connection method of claim 1, wherein said polyphase power source is a three-phase power source, and the primary winding comprises three individual tapped phase windings.

3. The connection method of claim 2, wherein said tap of each phase winding is disposed at about 64% of the turns from the second end to the first end of the winding.

4. The connection method of claim 1, wherein said alternating current has a substantially sinusoidal waveform.

5. The connection method of claim 2, further comprising connecting said primary tapped phase windings in a delta configuration.

6. The connection method of claim 2, further comprising connecting said primary tapped phase windings in a wye configuration.

7. The connection method of claim 6, further comprising connecting said primary tapped windings to include a neutral or ground conductor electrically connected to a central node of the wye winding.

8. The connection method of claim 1, further comprising connecting second phase windings in parallel to the first phase windings to form a secondary winding.

9. The connection method of claim 1, further comprising connecting a plurality of capacitive elements in parallel to said second phase windings of said secondary winding.

10. The connection method of claim 1, wherein said capacitive elements are capacitors.

11. The connection method of claim 10, wherein said capacitive elements are variable capacitors.

12. The connection method of claim 8, further comprising:
   disposing a secondary phase tap between a middle and a first end of each of the second phase windings;
   disposing one or more switches in series with capacitive elements between each secondary phase tap and a second end of each of the second phase winding for selectively disconnecting at least one of said capacitive elements from said winding.

13. A polyphase induction motor, comprising:
   a motor casing;
   a rotor rotatably mounted to said casing; and
   a stator fixedly mounted to said casing and substantially surrounding said rotor, said stator generating a rotating magnetic field in the area of said rotor using a polyphase stator winding, said polyphase winding further including;
      a primary winding having a plurality of first phase windings, each of said first phase windings being electrically connected to at least one other of said first phase windings and having a tap between a center and a first end of said first phase winding; and
      at least one capacitive element connected in parallel to said first phase winding between said tap and a second end of said first phase winding opposite said first end thereof;
      wherein said capacitive elements alternately charge and discharge during the application of a polyphase alternating current to said electrical leads.

14. The induction motor of claim 13, wherein said rotor is a squirrel cage configuration.

15. The induction motor of claim 13, wherein said rotor is wound.

16. The induction motor of claim 13, wherein said capacitive elements are each parallel to about 64% of one of said first phase windings.

17. The induction motor of claim 13, wherein said capacitive elements are approximately equal to each other in capacitance, and the tap of each phase winding is disposed at approximately the same proportion of turns of the phase winding as the tap of each other phase winding.

18. The induction motor of claim 13, wherein said tap of each phase winding is disposed a variable proportion of a distance from the center to the first end of the phase winding.

19. The induction motor of claim 13, wherein said primary winding is electrically connected in a delta configuration.

20. The induction motor of claim 13, wherein said primary winding is electrically connected in a wye configuration.

21. A polyphase induction motor winding, comprising:
   a tapped three-phase winding arranged in a predetermined configuration, taps of said winding being disposed in the vicinity of 64% of a turns distance from a second end of each individual phase winding toward a first end of the phase winding;
   at least one capacitive element connected in parallel between the tap and the second end of each phase of said tapped winding, wherein said capacitive elements alternately charge and discharge during the application of a three-phase alternating current to said polyphase induction motor winding.

22. A three-phase induction motor, comprising:
   a rotor, said rotor being rotatably mounted within said motor;
   a stator, said stator having a magnetically permeable core and substantially surrounding said rotor, said stator further including a three-phase stator winding having three phase windings arranged in a predetermined configuration, each winding tapped at a tap point not centered on the winding, said tapped windings being electrically connected to one another;
   at least one capacitive element connected in parallel between the tap point and an end of each of said tapped phase windings, wherein said at least one capacitive element alternately charges and discharges during the application of a three-phase alternating current to said stator winding.

23. A method of operating an induction motor having a polyphase stator winding comprising a plurality of individual phase windings and a rotor, said method comprising:
   applying a polyphase alternating current to said single polyphase winding;
   generating a rotating magnetic field in the region of said rotor, said magnetic field rotating at a first speed;
   allowing said rotor to rotate at a second speed in response to said rotating magnetic field; and
   passively charging and discharging at least one capacitive element during operation of said motor, said at least one capacitive element being connected in parallel between an end and a tap off center of a respective one of the individual phase windings.

24. The method of claim 23, wherein said method further includes the act of varying capacitance of said at least one capacitive element after connection to said phase winding to optimize a parameter associated with said motor.

25. The method of claim 24, wherein said parameter being optimized is motor efficiency.

26. The method of claim 23, wherein said polyphase alternating current applied to said polyphase winding is a three-phase current.

27. The method of claim 23, wherein the act of connecting said at least one capacitive element is accomplished using at least one switch element connected electrically in series with said at least one capacitive element.

28. A polyphase induction motor, comprising:
   a rotor, said rotor being rotatably mounted within said motor;
   means for generating a rotating magnetic field in the vicinity of said rotor, said means for generating a rotating magnetic field including a magnetically permeable stator core and further comprising
   a first winding arranged in a predetermined configuration;
   a tapped second winding also arranged in said predetermined configuration, said tapped second winding being electrically connected to said first winding, taps of said second winding being disposed between middle and a first end of each individual phase winding of said tapped second winding, and
   passive capacitive elements connected between each tap and a second end of each individual phase winding for storing energy such that said stator core is maintained within a desired range of saturation.

29. The induction motor of claim 28, wherein said predetermined configuration is a delta configuration.

30. The induction motor of claim 28, wherein said predetermined configuration is a wye configuration.

31. The connection method of claim 1, wherein the taps are disposed at variable positions between the center and the first end of each first phase winding.

* * * * *